United States Patent
Ha et al.

(10) Patent No.: US 8,031,724 B2
(45) Date of Patent: *Oct. 4, 2011

(54) HOME NETWORK SYSTEM

(75) Inventors: Sam-Chul Ha, Changwon-shi (KR); Seung-Myun Baek, Changwon-Shi (KR); Koon-Seok Lee, Changwon-Shi (KR); Yong-Tae Kim, Gimhae-Shi (KR)

(73) Assignee: LG Electronics Inc., Seoul (KR)

( * ) Notice: Subject to any disclaimer, the term of this patent is extended or adjusted under 35 U.S.C. 154(b) by 428 days.

This patent is subject to a terminal disclaimer.

(21) Appl. No.: 10/558,426

(22) PCT Filed: May 14, 2004

(86) PCT No.: PCT/KR2004/001149
§ 371 (c)(1),
(2), (4) Date: Nov. 29, 2005

(87) PCT Pub. No.: WO2004/107090
PCT Pub. Date: Dec. 9, 2004

(65) Prior Publication Data
US 2007/0025368 A1    Feb. 1, 2007

(30) Foreign Application Priority Data

May 30, 2003 (KR) .................. 10-2003-0034962
Mar. 31, 2004 (KR) .................. 10-2004-0022186

(51) Int. Cl.
*H04L 12/28* (2006.01)
*H04J 3/16* (2006.01)
*G06F 15/16* (2006.01)
*G06F 15/173* (2006.01)

(52) U.S. Cl. ......... 370/401; 370/466; 709/208; 709/224

(58) Field of Classification Search .................. 370/401, 370/400, 390, 465; 709/226, 238
See application file for complete search history.

(56) References Cited

U.S. PATENT DOCUMENTS

| 4,888,728 A | 12/1989 | Shirakawa et al. |
| 4,928,245 A | 5/1990 | Moy et al. |
| 4,980,913 A | 12/1990 | Skret |
| 5,268,666 A * | 12/1993 | Michel et al. ............ 340/310.16 |
| 5,519,858 A | 5/1996 | Walton et al. |

(Continued)

FOREIGN PATENT DOCUMENTS

CN    1199192    11/1998

(Continued)

OTHER PUBLICATIONS

Lee et al. (A New Control Protocol for Home Appliances—LnCP (2001)).*

(Continued)

*Primary Examiner* — Marsha D Banks Harold
*Assistant Examiner* — Christopher Wyllie
(74) *Attorney, Agent, or Firm* — McKenna Long & Aldridge LLP

(57) ABSTRACT

The present invention discloses a home network system using a living network control protocol. The home network system includes: at least one electric device; first and second networks based on a predetermined living network control protocol (LnCP); an LnCP access device connected to the electric device through the second network; and a network manager connected to the LnCP access device through the first network, for controlling and monitoring the electric device.

6 Claims, 7 Drawing Sheets

U.S. PATENT DOCUMENTS

| | | | |
|---|---|---|---|
| 5,551,001 A | 8/1996 | Cohen et al. | |
| 5,794,037 A | 8/1998 | Young | |
| 5,808,885 A | 9/1998 | Dew et al. | |
| 5,835,723 A | 11/1998 | Andrews et al. | |
| 5,859,847 A | 1/1999 | Dew et al. | |
| 5,867,666 A | 2/1999 | Harvey | |
| 5,991,302 A * | 11/1999 | Berl et al. | 370/400 |
| 6,006,272 A | 12/1999 | Aravamudan et al. | |
| 6,058,106 A * | 5/2000 | Cudak et al. | 370/313 |
| 6,078,952 A | 6/2000 | Fielding et al. | |
| 6,105,093 A * | 8/2000 | Rosner et al. | 710/105 |
| 6,160,808 A | 12/2000 | Maurya | |
| 6,233,248 B1 * | 5/2001 | Sautter et al. | 370/465 |
| 6,366,583 B2 | 4/2002 | Rowett et al. | |
| 6,415,313 B1 | 7/2002 | Yamada et al. | |
| 6,453,687 B2 * | 9/2002 | Sharood et al. | 62/127 |
| 6,507,953 B1 | 1/2003 | Horlander et al. | |
| 6,522,654 B1 | 2/2003 | Small | |
| 6,615,243 B1 | 9/2003 | Megeid et al. | |
| 6,618,764 B1 | 9/2003 | Shteyn | |
| 6,631,476 B1 | 10/2003 | Vandesteeg et al. | |
| 6,701,198 B1 | 3/2004 | Vandesteeg et al. | |
| 6,721,900 B1 | 4/2004 | Lenner et al. | |
| 6,731,201 B1 | 5/2004 | Bailey et al. | |
| 6,735,619 B1 | 5/2004 | Sawada | |
| 6,759,946 B2 | 7/2004 | Sahinoglu et al. | |
| 6,842,430 B1 | 1/2005 | Melnik | |
| 6,854,053 B2 | 2/2005 | Burkhardt et al. | |
| 6,856,999 B2 | 2/2005 | Flanagin et al. | |
| 6,891,850 B1 | 5/2005 | Vandesteeg et al. | |
| 6,915,444 B2 | 7/2005 | Vasko et al. | |
| 6,934,740 B1 | 8/2005 | Lawande et al. | |
| 6,982,960 B2 | 1/2006 | Lee et al. | |
| 6,987,462 B2 | 1/2006 | Bae et al. | |
| 7,028,312 B1 | 4/2006 | Merrick et al. | |
| 7,035,270 B2 * | 4/2006 | Moore et al. | 370/401 |
| 7,058,722 B2 | 6/2006 | Ikami et al. | |
| 7,062,531 B2 | 6/2006 | Kim | |
| 7,103,834 B1 | 9/2006 | Humpleman et al. | |
| 7,107,358 B2 | 9/2006 | Vasko et al. | |
| 7,111,100 B2 | 9/2006 | Ellerbrock | |
| 7,149,792 B1 | 12/2006 | Hansen et al. | |
| 7,200,683 B1 | 4/2007 | Wang et al. | |
| 7,257,104 B2 | 8/2007 | Shitama | |
| 7,287,062 B2 | 10/2007 | Im et al. | |
| 7,308,644 B2 | 12/2007 | Humpleman et al. | |
| 7,353,259 B1 | 4/2008 | Bakke et al. | |
| 7,389,332 B1 | 6/2008 | Muchow et al. | |
| 7,389,358 B1 * | 6/2008 | Matthews et al. | 709/238 |
| 7,401,120 B2 * | 7/2008 | Walbeck et al. | 709/203 |
| 7,403,994 B1 * | 7/2008 | Vogl et al. | 709/227 |
| 7,412,538 B1 | 8/2008 | Eytchison et al. | |
| 7,421,478 B1 | 9/2008 | Muchow | |
| 7,430,591 B2 | 9/2008 | Chamberlain | |
| 7,437,494 B2 | 10/2008 | Ellerbrock | |
| 7,454,517 B2 * | 11/2008 | Ha et al. | 709/236 |
| 7,461,164 B2 | 12/2008 | Edwards et al. | |
| 7,673,030 B2 * | 3/2010 | Hite et al. | 709/223 |
| 7,673,153 B1 | 3/2010 | Oishi et al. | |
| 7,844,680 B2 * | 11/2010 | Ha et al. | 709/208 |
| 7,903,670 B2 * | 3/2011 | Ha et al. | 370/401 |
| 7,949,786 B2 * | 5/2011 | Ha et al. | 709/245 |
| 2001/0025322 A1 * | 9/2001 | Song et al. | 709/249 |
| 2002/0011923 A1 | 1/2002 | Cunningham et al. | |
| 2002/0021465 A1 * | 2/2002 | Moore et al. | 359/125 |
| 2002/0026528 A1 * | 2/2002 | Lo | 709/245 |
| 2002/0035624 A1 * | 3/2002 | Kim | 709/222 |
| 2002/0038358 A1 | 3/2002 | Sweatt, III et al. | |
| 2002/0059617 A1 | 5/2002 | Terakado et al. | |
| 2002/0072356 A1 | 6/2002 | Yamashita et al. | |
| 2002/0103898 A1 | 8/2002 | Moyer et al. | |
| 2002/0118696 A1 | 8/2002 | Suda | |
| 2002/0120763 A1 | 8/2002 | Miloushev et al. | |
| 2002/0165989 A1 * | 11/2002 | Etoh | 709/248 |
| 2002/0193144 A1 | 12/2002 | Belski et al. | |
| 2003/0009537 A1 | 1/2003 | Wang | |
| 2003/0014630 A1 | 1/2003 | Spencer et al. | |
| 2003/0037166 A1 | 2/2003 | Ueno et al. | |
| 2003/0038730 A1 | 2/2003 | Imafuku et al. | |
| 2003/0051053 A1 | 3/2003 | Vasko et al. | |
| 2003/0051203 A1 | 3/2003 | Vasko et al. | |
| 2003/0053477 A1 | 3/2003 | Kim et al. | |
| 2003/0054809 A1 | 3/2003 | Bridges et al. | |
| 2003/0065824 A1 * | 4/2003 | Kudo | 709/250 |
| 2003/0067910 A1 * | 4/2003 | Razazian et al. | 370/352 |
| 2003/0079000 A1 | 4/2003 | Chamberlain | |
| 2003/0079001 A1 | 4/2003 | Chamberlain | |
| 2003/0083758 A1 | 5/2003 | Williamson | |
| 2003/0085795 A1 * | 5/2003 | An | 340/3.1 |
| 2003/0088703 A1 * | 5/2003 | Kim | 709/245 |
| 2003/0158956 A1 * | 8/2003 | Tanaka et al. | 709/230 |
| 2003/0165142 A1 * | 9/2003 | Mills et al. | 370/395.62 |
| 2004/0037279 A1 * | 2/2004 | Zelig et al. | 370/390 |
| 2004/0042487 A1 * | 3/2004 | Ossman | 370/466 |
| 2004/0047298 A1 | 3/2004 | Yook et al. | |
| 2004/0064578 A1 * | 4/2004 | Boucher et al. | 709/236 |
| 2004/0088731 A1 | 5/2004 | Putterman et al. | |
| 2004/0111490 A1 | 6/2004 | Im et al. | |
| 2004/0158333 A1 | 8/2004 | Ha et al. | |
| 2004/0184456 A1 | 9/2004 | Binding et al. | |
| 2004/0205309 A1 | 10/2004 | Watanabe | |
| 2004/0243684 A1 | 12/2004 | Ha et al. | |
| 2005/0108568 A1 | 5/2005 | Bussiere et al. | |
| 2005/0190727 A1 | 9/2005 | Vanlieshout et al. | |
| 2006/0047677 A1 | 3/2006 | Lin et al. | |
| 2006/0248158 A1 * | 11/2006 | Ha et al. | 709/208 |
| 2006/0248228 A1 * | 11/2006 | Ha et al. | 709/245 |
| 2006/0248518 A1 | 11/2006 | Kundert | |
| 2006/0251086 A1 * | 11/2006 | Ha et al. | 370/401 |
| 2006/0271709 A1 | 11/2006 | Vasko et al. | |
| 2007/0019615 A1 | 1/2007 | Baek et al. | |
| 2007/0025368 A1 * | 2/2007 | Ha et al. | 370/401 |
| 2008/0097631 A1 | 4/2008 | Baek et al. | |
| 2008/0140797 A1 * | 6/2008 | Ha et al. | 709/208 |
| 2008/0222325 A1 | 9/2008 | Ishino et al. | |
| 2008/0255692 A1 | 10/2008 | Hofrichter et al. | |
| 2008/0259786 A1 * | 10/2008 | Gonda | 370/218 |
| 2010/0005166 A1 * | 1/2010 | Chung | 709/224 |

FOREIGN PATENT DOCUMENTS

| | | |
|---|---|---|
| CN | 1398469 | 2/2003 |
| EP | 1 202 493 | 5/2002 |
| JP | 60-112336 | 6/1985 |
| JP | 61-216543 | 9/1986 |
| JP | 2002-325079 | 11/2002 |
| KR | 10-2001-0093265 | 10/2001 |
| KR | 10-2002-0064847 | 8/2002 |
| KR | 10-2003-0040766 | 5/2003 |
| WO | WO 01/80030 A1 | 10/2001 |
| WO | WO 02/097555 | 12/2002 |

OTHER PUBLICATIONS

Kim et al. (Home Networking Digital TV Based on LnCP—Nov. 2002).*

Lee et al. (A New Control Protocol for Home Appliances—LnCP—2001).*

Kim et al. (Home Networking Digital TV Based on LnCP—2002).*

A New Control Protocol for Home Appliances—LnCP Koon-Seok Lee, Hoan-Jong Choi, Chang-Ho Kim, Seung-Myun Baek—2001.*

Home Networking Digital TV Based on LnCP—Seungchann Kim, Jeongae Park, Kyoungwoo Lee and Sangwook Um Digital TV—2002.*

Network Configuration Technique for Home Appliances—Koon-Seok Lee, Suk Lee, Ki-Tae Oh, Seung-Myun Baek—2002.*

Home Network Control Protocol for Networked Home Appliances and Its Application—Jae-Min Lee, Kwan-Joo Myoung, Dong-Sung Kim, Wook-Hyun Kwon, Beom Seog Ko, Young-Man Kim, and Yo Hee Kim—2006.*

Koon-Seok Lee, Hoan-Jongf Choi, Chang-Ho Kim, Seung-Myun Baek, 'A new control protocol for home appliances-LnCP.' In: International Symposium on Industrial Electronics, 2001. Proceedings. ISIE 2001. Jun. 12-16, 2001 pp. 286-291 vol. 1.

Seungcheon Kim, et al., "Home Networking Digital TV based on LnCP," IEEE Transactions on Consumer Electronics, vol. 48, No. 4, Nov. 2002, pp. 990-996.

Koon-Seok Lee, et al., "A New Control Protocol for Home Appliances. LnCP", Digital Appliance Co. Research Lab., 2001 IEEE, pp. 286291.

Simon Baatz. et al., Handoff Support for Mobility with IP over Bluetooth, Univ. of Bonn, Inst. of Computer Sci IV (2000 IEEE), p. 143-154.

Lee et al., "A New Home Network Protocol for Controlling and Monitoring Home Appliances-HNCP", IEEE, 2002, p. 312-313.

Wang et al., "Towards Dependable Home Networking: An Experience Report", IEEE, 2000, pp. 43-48.

Hwang et al., "ATM-based plug-and-play technique for in-home networking", Electronics Letters, vol. 34, No. 22, pp. 2088-2090, 1998.

Manner et al., "Evaluation of Mobility and quality of service interaction", The International Journal of Computer and Telecommunications Networking, vol. 38, No. 2, pp. 137-163, 2002.

Ganz et al., "Q-Soft: software framework for QoS support in home networks", Computer Networks, vol. 42, No. 1, pp. 7-22, 2003.

Kent et al., "Security Architecture for the Internet Protocol", Network Working Group, Nov. 1998, pp. 1-66.

Lee et al., "Home Network Control Protocol for Networked Home Appliances and Its Application", IEEE, pp. 1-7, 2002.

"Introduction and Technology Trend of Home Network," Samsung SDS IT Review, Jan. 2002 (Korean language with English translation).

Koon-Seok Lee, et al., "Network Configuration Technique for Home Appliances based on LnCP," 2003 IEEE, pp. 367-374.

Koon-Seok Lee et al., "Network Configuration Technique for Home Appliances," Consumer Electronics, 2002, ICCE, 2002 Digest of Technical Papers, International Conference, 10.1109/ICCE.2002. 1013981, May 2002, pp. 180-181.

* cited by examiner

| Field | SLP | DA | SA | PL | NLC | APDU | CRC | ELP |
|---|---|---|---|---|---|---|---|---|
| # of bits | 8 | 16 | 16 | 8 | 24 | N | 16 | 8 |

| Field | SP | NHL | PV | NPT | TC | PN |
|---|---|---|---|---|---|---|
| # of bits | 3 | 5 | 8 | 4 | 2 | 2 |

HOME NETWORK SYSTEM

This is a National Stage application of PCT application No. PCT/KR2004/001149 filed May 14, 2004, which claims the foreign priority benefits of Korean applications 10-2003-0034962 and 10-2004-0022186 filed May 30, 2003 and Mar. 31, 2004, respectively. The entire disclosure of the prior applications is hereby incorporated by reference herein in its entirety.

TECHNICAL FIELD

The present invention relates to a home network system, and more particularly to, a home network system using a living network control protocol.

BACKGROUND ART

A home network connects various digital home appliances so that the user can always enjoy convenient, safe and economic life services inside or outside the house. Refrigerators or washing machines called white home appliances have been gradually digitalized due to the development of digital signal processing techniques, home appliance operating system techniques and high speed multimedia communication techniques have been integrated on the digital home appliances, and new information home appliances have been developed, to improve the home network.

As shown in Table 1, the home network is classified into a data network, an entertainment network and a living network by types of services.

TABLE 1

| Classification | Function | Service type |
| --- | --- | --- |
| Data network | Network between PC and peripheral devices | Data exchange, internet service, etc. |
| Entertainment network | Network between A/V devices | Music, animation service, etc. |
| Living network | Network for controlling home appliances | Home appliances control, home automation, remote meter reading, message service, etc. |

Here, the data network is built to exchange data between a PC and peripheral devices or provide an internet service, and the entertainment network is built between home appliances using audio or video information. In addition, the living network is built to simply control home appliances, such as home automation or remote meter reading.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system.

In addition, the conventional arts do not provide a general communication standard which can be applied to a home network system including networks using different transmission media and/or different dependent transmission media, and router devices based on the communication standard.

DISCLOSURE OF THE INVENTION

The present invention is achieved to solve the above problems. An object of the present invention is to provide a home network system using a control protocol which is a general communication standard for providing functions of controlling and monitoring electric devices in the home network system.

Another object of the present invention is to provide a home network system using a living network control protocol as a general communication standard.

Yet another object of the present invention is to provide a home network system which supplies a general communication standard applicable to a home network system including networks using different transmission media and/or different dependent transmission media, and router devices based on the communication standard.

In order to achieve the above-described objects of the invention, there is provided a home network system including: at least one electric device; first and second networks based on a predetermined living network control protocol (LnCP); an LnCP access device connected to the electric device through the second network; and a network manager connected to the LnCP access device through the first network, for controlling and monitoring the electric device.

Preferably, the first network and the second network are networks including different transmission media.

Preferably, the first network is a network using a dependent transmission medium, and the dependent transmission medium is a power line.

Preferably, the dependent transmission medium is wireless.

Preferably, the LnCP access device further includes a home code control sub-layer for managing a home code for network security, and communicates with the first network.

Preferably, the first network and the second network are networks using different dependent transmission media.

Preferably, the LnCP access device further includes a plurality of home code control sub-layers for managing home codes for network security, and communicates with the first network and the second network.

Preferably, the home code control sub-layers correspond to the dependent transmission media, respectively.

Preferably, the home codes of the home code control sub-layers have different values.

According to one aspect of the present invention, an access device based on a living network control protocol uses a protocol having an upper layer; a first physical layer for accessing a first network connected to at least one network manager; and a second physical layer for accessing a second network connected to at least one electric device.

Preferably, the first physical layer and the second physical layer are connected to the first and second networks including different transmission media.

Preferably, the first physical layer is connected to the first network using a dependent transmission medium.

Preferably, the dependent transmission medium is a power line.

Preferably, the dependent transmission medium is wireless.

Preferably, the upper layer further includes a home code control sub-layer for managing a home code for network security, and is connected to the first network.

Preferably, the first physical layer and the second physical layer are connected to the first and second networks using different dependent transmission media.

Preferably, the upper layer further includes a plurality of home code control sub-layers for managing home codes for network security, and is connected to the first network and the second network.

Preferably, the home code control sub-layers correspond to the first physical layer and the second physical layer, respectively.

Preferably, the home codes of the home code control sub-layers have different values.

BEST MODE FOR CARRYING OUT THE INVENTION

A home network system in accordance with the present invention will now be described in detail with reference to the accompanying drawings.

Figure 1:
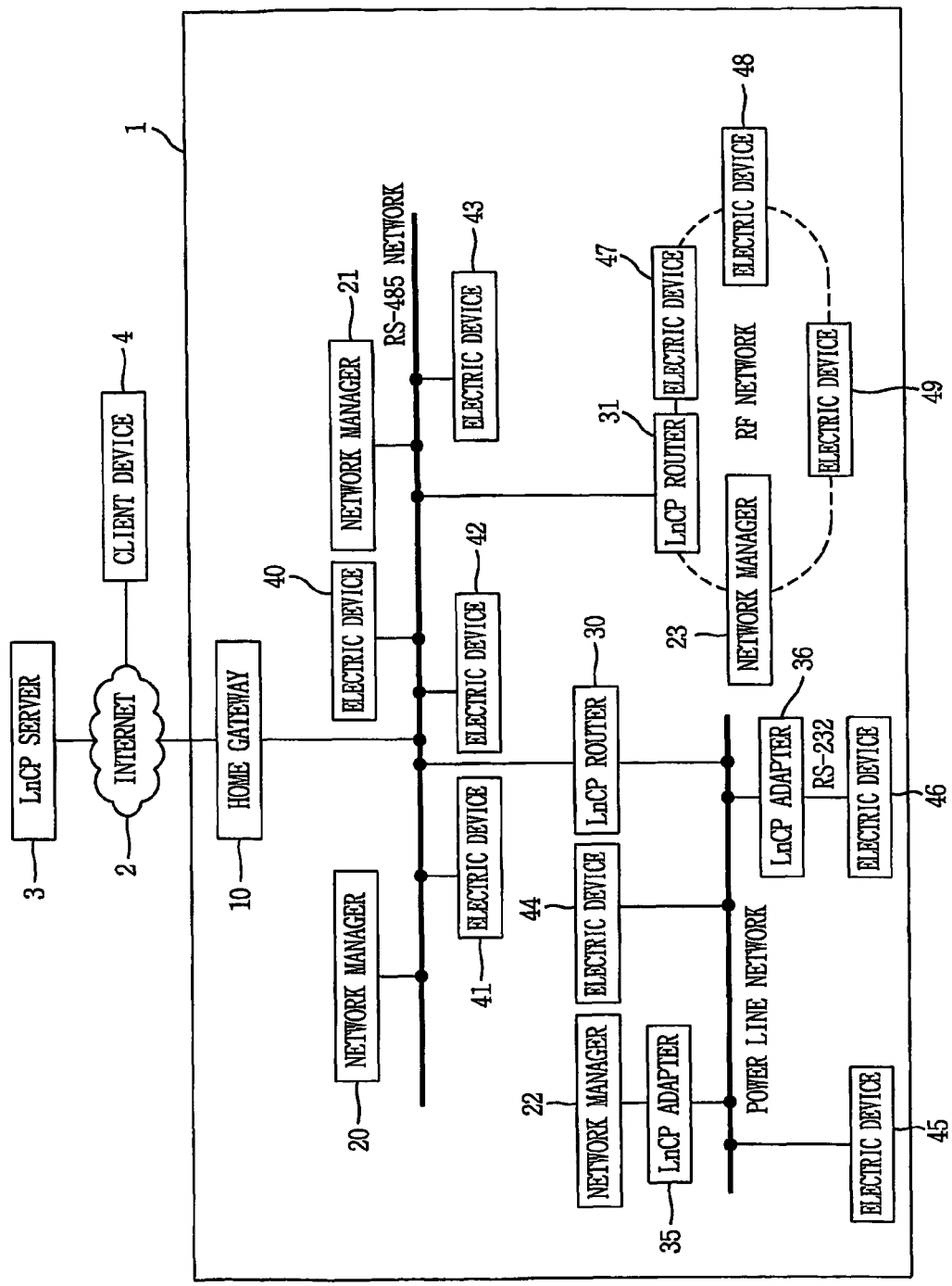
FIG. 1 is a structure view illustrating a home network system in accordance with the present invention.

FIG. 1 is a structure view illustrating the home network system in accordance with the present invention.

Referring to FIG. 1, the home network system 1 accesses an LnCP server 3 through an internet 2, and a client device 4 accesses the LnCP server 3 through the internet 2. That is, the home network system 1 is connected to communicate with the LnCP server 3 and/or the client device 4.

An external network of the home network system 1 such as the internet 2 includes additional constitutional elements according to a kind of the client device 4. For example, when the client device 4 is a computer, the Internet 2 includes a Web server (not shown), and when the client device 4 is an internet phone, the internet 2 includes a Wap server (not shown).

The LnCP server 3 accesses the home network system 1 and the client device 4 according to predetermined login and logout procedures, respectively, receives monitoring and control commands from the client device 4, and transmits the commands to the network system 1 through the internet 2 in the form of predetermined types of messages. In addition, the LnCP server 3 receives a predetermined type of message from the home network system 1, and stores the message and/or transmits the message to the client device 4. The LnCP server 3 also stores or generates a message, and transmits the message to the home network system 1. That is, the home network system 1 accesses the LnCP server 3 and downloads provided contents.

The home network system 1 includes a home gateway 10 for performing an access function to the internet 2, network managers 20 to 23 for performing a function of setting an environment and managing electric devices 40 to 49, LnCP routers 30 and 31 for access between transmission media, LnCP adapters 35 and 36 for connecting the network manager 22 and the electric device 46 to the transmission medium, and the plurality of electric devices 40 to 49.

The network of the home network system 1 is formed by connecting the electric devices 40 to 49 through a shared transmission medium. A data link layer uses a non-standardized transmission medium such as RS-485 or small output RF, or a standardized transmission medium such as a power line and IEEE 802.11 as the transmission medium.

The network of the home network system 1 is separated from the internet 2, for composing an independent network for connecting the electric devices through wire or wireless transmission medium. Here, the independent network includes a physically-connected but logically-divided network.

The home network system 1 includes master devices for controlling operations of the other electric devices 40 to 49 or monitoring statuses thereof, and slave devices having functions of responding to the request of the master devices and nothing their status change information. The master devices include the network managers 20 to 23, and the slave devices include the electric devices 40 to 49. The network managers 20 to 23 include information of the controlled electric devices 40 to 49 and control codes, and control the electric devices 40 to 49 according to a programmed method or by receiving inputs from the LnCP server 3 and/or the client device 4. Still referring to FIG. 1, when the plurality of network managers 20 to 23 are connected, each of the network managers 20 to 23 must be both the master device and the slave device, namely physically one device but logically the device (hybrid device) for simultaneously performing master and slave functions in order to perform information exchange, data synchronization and control with the other network managers 20 to 23.

In addition, the network managers 20 to 23 and the electric devices 40 to 49 can be connected directly to the network (power line network, RS485 network and RF network) or through the LnCP routers 30 and 31 and/or the LnCP adapters 35 and 36.

The electric devices 40 to 49 and/or the LnCP routers 30 and 31 and/or the LnCP adapters 35 and 36 are registered in the network managers 20 to 23, and provided with intrinsic logical addresses by products (for example, 0x00, 0x01, etc.). The logical addresses are combined with product codes (for example, 0x02 of air conditioner and 0x01 of washing machine), and used as node addresses. For example, the electric devices 40 to 49 and/or the LnCP routers 30 and 31 and/or the LnCP adapters 35 and 36 are identified by the node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical addresses and/or the product codes with 1. Especially, the implicit group address is called a cluster code.

Figure 2:
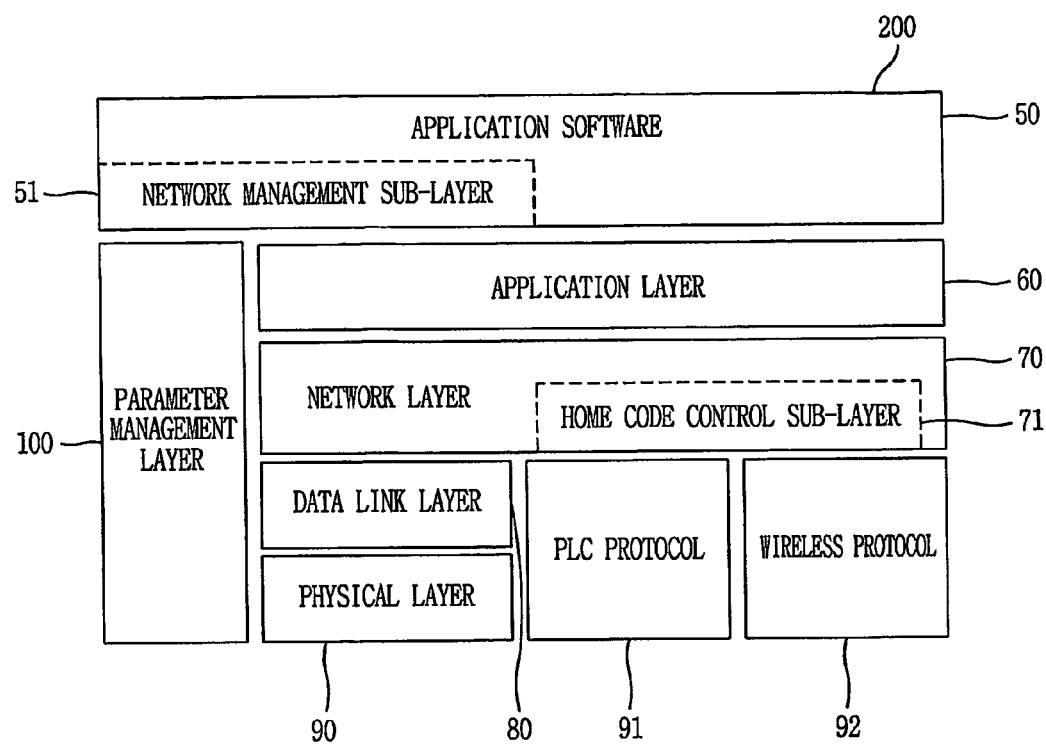
FIG. 2 is a structure view illustrating a living network control protocol stack in accordance with the present invention.

FIG. 2 is a structure view illustrating a living network control protocol stack in accordance with the present invention. The home network system 1 enables the network managers 20 to 23, the LnCP routers 30 and 31, the LnCP adapters 35 and 36 and the electric devices 40 to 49 to communicate with each other according to the living network control protocol (LnCP) of FIG. 2. Therefore, the network managers 20 to 23, the LnCP routers 30 and 31, the LnCP adapters 35 and 36 and the electric devices 40 to 49 perform network communication according to the LnCP.

As illustrated in FIG. 2, the LnCP includes an application software 50 for performing intrinsic functions of the network managers 20 to 23, the LnCP routers 30 and 31, the LnCP adapters 35 and 36 and the electric devices 40 to 49, and providing an interface function with an application layer 60 for remote controlling and monitoring on the network, the application layer 60 for providing services to the user, and also providing a function of forming information or a command from the user in the form of a message and transmitting the message to the lower layer, a network layer 70 for reliably network-connecting the network managers 20 to 23, the LnCP routers 30 and 31, the LnCP adapters 35 and 36 and the electric devices 40 to 49, a data link layer 80 for providing a medium access control function of accessing a shared transmission medium, a physical layer 90 for providing physical interfaces between the network managers 20 to 23, the LnCP routers 30 and 31, the LnCP adapters 35 and 36 and the electric devices 40 to 49, and rules for transmitted bits, and a parameter management layer 100 for setting and managing node parameters used in each layer.

In detail, the application software 50 further includes a network management sub-layer 51 for managing the node parameters, and the network managers 20 to 23, the LnCP routers 30 and 31, the LnCP adapters 35 and 36 and the electric devices 40 to 49 which access the network. That is, the network management sub-layer 51 performs a parameter management function of setting or using the node parameter values through the parameter management layer 100, and a network management function of composing or managing the network when the device using the LnCP is a master device.

When the network which the network managers 20 to 23, the LnCP routers 30 and 31, the LnCP adapters 35 and 36 and the electric devices 40 to 49 access is a dependent transmission medium such as a power line, IEEE 802.11 and wireless (for example, when the LnCP includes a PLC protocol and/or wireless protocol), the network layer 70 further includes a home code control sub-layer 71 for performing a function of setting, managing and processing home codes for logically dividing each individual network. When the individual networks are physically divided by an independent transmission medium such as RS-485, the home code control sub-layer 71 is not included in the LnCP. Each of the home codes is comprised of 4 bytes, and set as random values or designated values of the user.

Figure 3A:
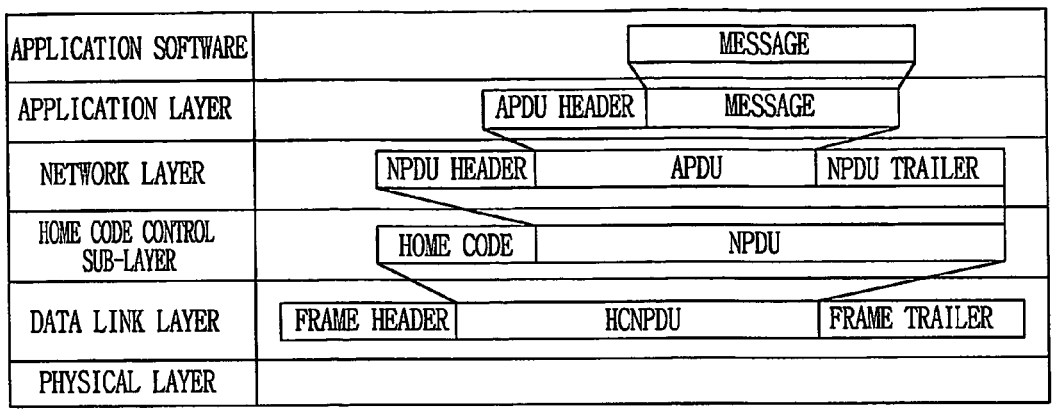
FIGS. 3A and 3B are structure views illustrating interfaces between layers of FIG. 2, respectively.
Figure 3B:
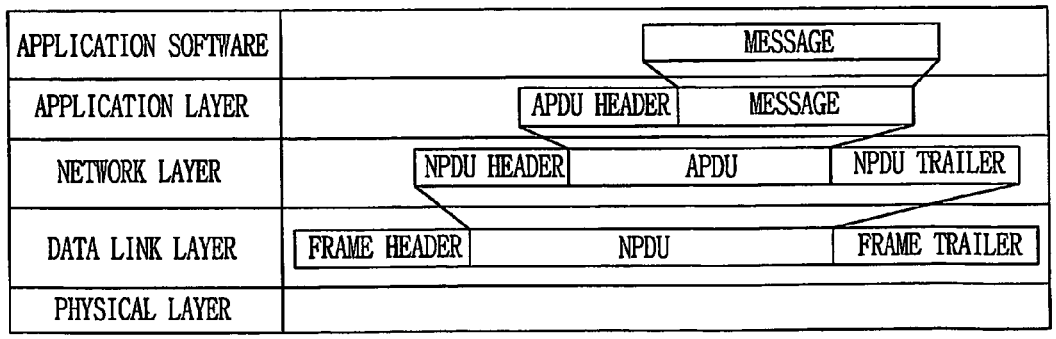

FIGS. 3A and 3B are structure views illustrating interfaces between the layers of FIG. 2, respectively.

FIG. 3A illustrates the interfaces between the layers when the physical layer 90 is connected to the dependent transmission medium, and FIG. 3B illustrates the interfaces between the layers when the physical layer 90 is connected to the independent transmission medium.

The home network system 1 adds headers and trailers required by each layer to protocol data units (PDU) from the upper layers, and transmit them to the lower layers.

As shown in FIGS. 3A and 3B, an application layer PDU (APDU) is a data transmitted between the application layer 60 and the network layer 70, a network layer PDU (NPDU) is a data transmitted between the network layer 70 and the data link layer 80 or the home code control sub-layer 71, and a home code control sub-layer PDU (HCNPDU) is a data transmitted between the network layer 70 (precisely, the home code control sub-layer 71) and the data link layer 80. The interface is formed in data frame units between the data link layer 80 and the physical layer 90.

FIGS. 4A to 4F are detailed structure views illustrating the interfaces of FIGS. 3A and 3B, respectively.

Figures 4A, 4B, 4C:
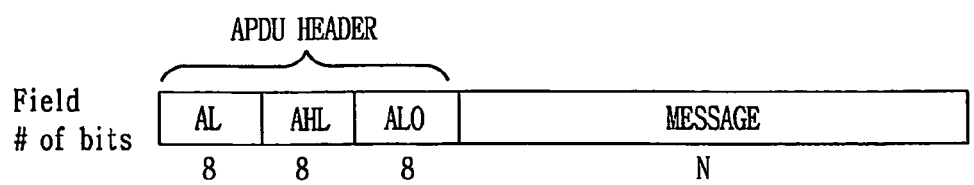
FIGS. 4A to 4F are detailed structure views illustrating the interfaces of FIGS. 3A and 3B, respectively.

FIG. 4A illustrates the APDU structure in the application layer 60.

An APDU length (AL) field shows a length of the APDU (length from AL to message field), and has a minimum value of 4 and a maximum value of 77.

An APDU header length (AHL) field shows a length of an APDU header (length from AL to ALO), normally has 3 bytes, and is extensible to 7 bytes. In the LnCP, the APDU header can be extended to 7 bytes to encode a message field and change an application protocol.

An application layer option (ALO) field extends a message set. For example, when the ALO field is set as 0, if the ALO field contains a different value, message processing is ignored.

The message field processes a control message from the user or event information, and is changed by the value of the ALO field.

FIG. 4B illustrates the NPDU structure in the network layer 70, and FIG. 4C illustrates a detailed NLC structure of the NPDU.

A start of LnCP packet (SLP) field shows start of a packet and has a value of 0x02.

Destination address (DA) and source address (SA) fields are node addresses of a receiver and a sender of a packet, and have 16 bits, respectively. The most significant 1 bit includes a flag indicating a group address, the succeeding 7 bits include a kind of a product (product code), and the lower 8 bits include a logical address for distinguishing the plurality of network managers 20 to 23 of the same kind and the plurality of electric devices 40 to 49 of the same kind.

A packet length (PL) field shows the whole length of the NPDU, and has a minimum value of 12 bytes and a maximum value of 100 bytes.

A service priority (SP) field gives transmission priority to a transmission message and has 3 bits. Table 2 shows the priority of each transmission message.

When a slave device responds to a request of a master device, the slave device takes the priority of the request message from the master device.

TABLE 2

| Priority | Value | Application layer |
|---|---|---|
| High | 0 | When an urgent message is transmitted |
| Middle | 1 | When a normal packet is transmitted |
| | | When an event message for online or offline status change is transmitted |
| Normal | 2 | When a notification message for composing a network is transmitted |
| | | When a normal event message is transmitted |
| Low | 3 | When a data is transmitted by download or upload mechanism |

An NPDU header length (NHL) field extends an NPDU header (NLC field of SLP), normally has 9 bytes, and is extensible maximally to 16 bytes.

A protocol version (PV) field is an one-byte field showing a version of a used protocol. The upper 4 bits include a version field and the lower 4 bits include a sub-version field. The version and the sub-version are represented by the hexadecimal, respectively.

A network layer packet type (NPT) field is a 4-bit field for distinguishing a kind of a packet in the network layer 70. The LnCP includes a request packet, a response packet and a notification packet. The NPT field of a master device must be set as the request packet or the notification packet, and the NPT field of a slave device must be set as the response packet or the notification packet. Table 3 shows NPT values by kinds of packets.

TABLE 3

| Explanation | Value |
| --- | --- |
| Request packet | 0 |
| Not used | 1~3 |
| Response packet | 4 |
| Not used | 5~7 |
| Notification packet | 8 |
| Not used | 9~12 |
| Reserved value for interface with the home code control sub-layer | 13~15 |

A transmission counter (TC) field is a 2-bit field for retrying a request packet when the request packet or response packet is not successfully transmitted due to a communication error in the network layer 70, or repeatedly transmitting a notification packet to improve a transmission success ratio. A receiver can check a duplicate message by using a value of the TC field. Table 4 shows the range of the values of the TC field by the NPT values.

TABLE 4

| Kind of packet | Value (range) |
| --- | --- |
| Request packet | 1~3 |
| Response packet | 1 |
| Notification packet | 1~3 |

A packet number (PN) field has 2 bits, and is used to check a duplicate packet in a slave device with the TC field and process a plurality of communication cycles in a master device. Table 5 shows the range of the values of the PN field by the NPT values.

TABLE 5

| Kind of packet | Value (range) |
| --- | --- |
| Request packet | 0~3 |
| Response packet | Copy a PN field value of a request packet |
| Notification packet | 0~3 |

An APDU field is a protocol data unit of the application layer 60 transmitted between the application layer 60 and the network layer 70. The APDU field has a minimum value of 0 byte and a maximum value of 88 bytes.

A cyclic redundancy check (CRC) field is a 16-bit field for checking an error of a received packet (from SLP to APDU).

An end of LnCP packet (ELP) field shows end of a packet and has a value of 0x03. Although a data corresponding to the length of the PL field is received, if the ELP field is not checked, it is deemed to be a packet error.

Figure 4D:
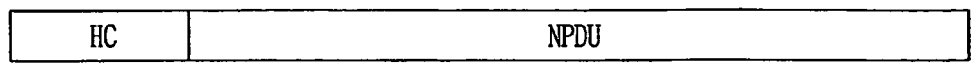

FIG. 4D illustrates the HCNPDU structure in the home code control sub-layer 71.

As depicted in FIG. 4D, a home code (HC) field is added to the upper portion of the NPDU.

The home code is comprised of 4 bytes, and has a unique value within the line distance where a packet can be transmitted.

Figure 4E:
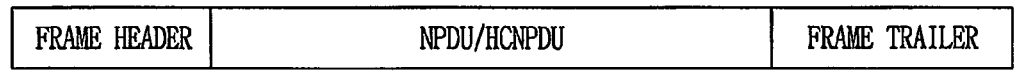

FIG. 4E illustrates a frame structure in the data link layer 80.

The structure of the header and the trailer of the data link layer frame of the LnCP is changed according to transmission media. When the data link layer 80 uses a non-standardized transmission medium, the header and the trailer of the frame must have null fields, and when the data link layer 80 uses a standardized transmission medium, the header and the trailer of the frame are formed as prescribed by the protocol. An NPDU field is a data unit transmitted from the upper network layer 70, and an HCNPDU field is a data unit obtained by adding 4 bytes of home code to the front portion of the NPDU, when the physical layer 90 is a dependent transmission medium such as a power line or IEEE 802.11. The data link layer 80 processes the NPDU and the HCNPDU in the same manner.

Figure 4F:
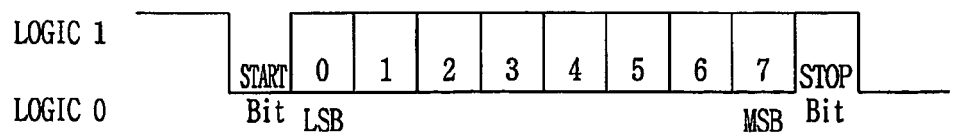

FIG. 4F illustrates a frame structure in the physical layer 90.

The physical layer 90 of the LnCP handles a function of transmitting and receiving a physical signal to a transmission medium. The data link layer 80 can use a non-standardized transmission medium such as RS485 or small output RF or a standardized transmission medium such as a power line or IEEE. 802.11 as the physical layer 90 of the LnCP. The home network system 1 using the LnCP employs a universal asynchronous receiver and transmitter (UART) frame structure and a signal level of RS-232, so that the network managers 20 to 23 and the electric devices 40 to 49 can interface with RS-485, the LnCP routers 30 and 31 or the LnCP adapters 35 and 36. When the UART is connected between the devices by using a serial bus, the UART controls flow of bit signals on a communication line. In the LnCP, a packet from the upper layer is converted into 10 bits of UART frame unit as shown in FIG. 4f, and transmitted through the transmission medium. The UART frame includes one bit of start bit, 8 bits of data and one bit of stop bit, and does not use a parity bit. The UART frame is transmitted in the order of the start bit to stop bit. When the home network system 1 using the LnCP employs the UART, it does not have additional frame header and frame trailer.

Figure 5A:
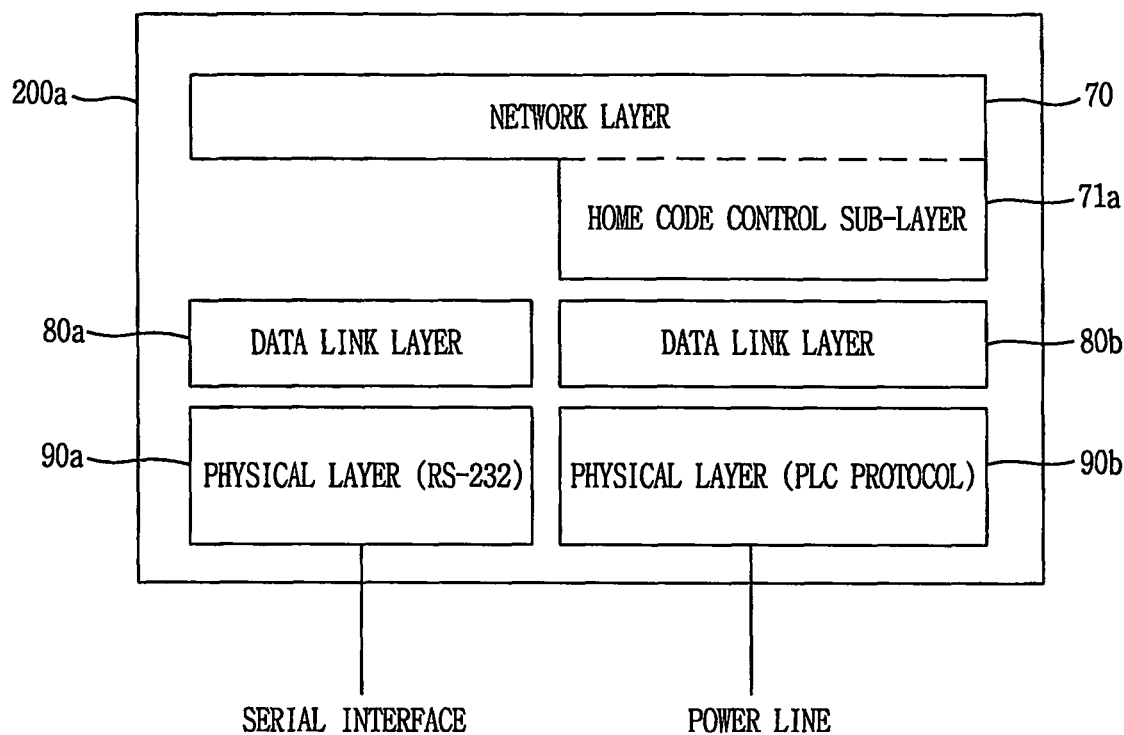
FIGS. 5A and 5B are structure views illustrating layers of an LnCP access device in accordance with first and second embodiments of the present invention.
Figure 5B:
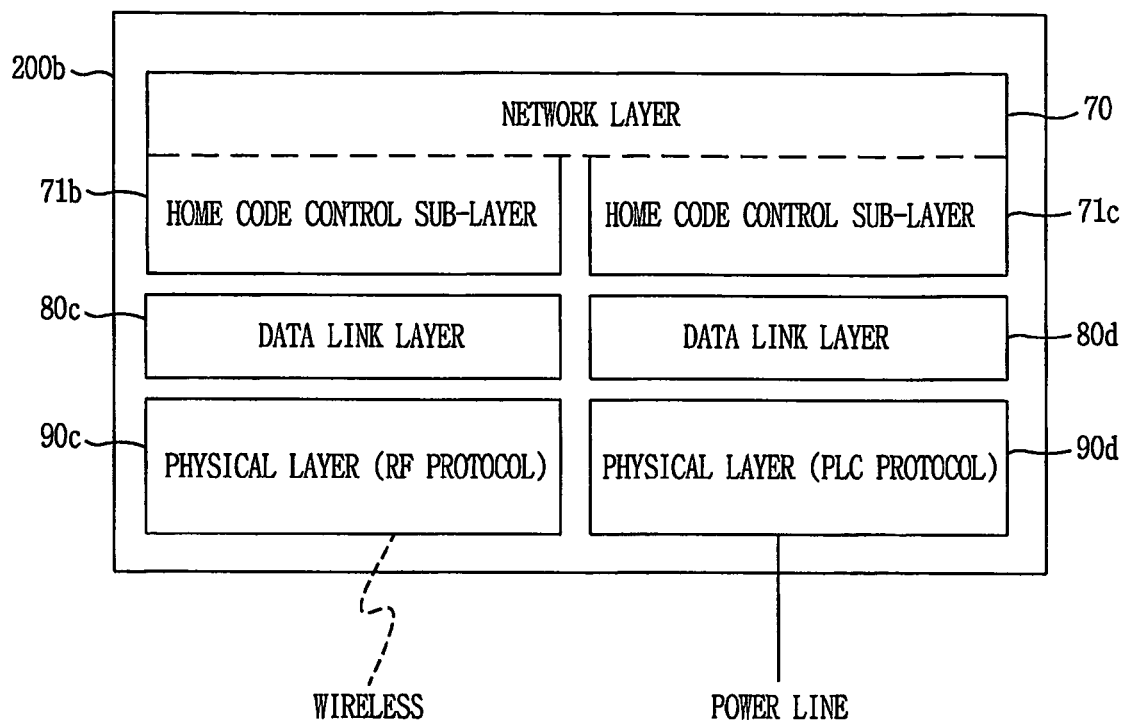

FIGS. 5A and 5B are structure views illustrating layers of the LnCP routers 30 and 31 in accordance with first and second embodiments of the present invention. As described above, each of the LnCP routers 30 and 31 transmits a packet from one medium to another medium, and each of the LnCP adapters 35 and 36 enables access to a private transmission medium such as RS-485, which are access devices for access between the transmission media based on the LnCP, or between the network manager 22 or the electric device 46 and the transmission medium.

The LnCP routers 30 and 31 and the LnCP adapters 35 and 36 (hereinafter, referred to as 'access devices') use one of the layer structures 200a and 200b of FIGS. 5a and 5b.

Referring to FIG. 5A, in the LnCP access devices 30, 31, 35 and 36, the layer structure 200a has two physical layers 90a and 90b to be connected to networks including different transmission media (for example, serial interface and power line). In addition to the power line, wireless can be used as a network using a dependent transmission medium. The layer structure 200a includes data link layers 80a and 80b corresponding to the physical layers 90a and 90b, respectively, and a network layer 70 for connecting the data link layers 80a and 80b. The upper layers of the network layer 70 are identical to those of FIG. 2, and thus not illustrated.

The layer structure 200a further includes a home code control sub-layer 71a for managing a home code for network security. The home code control sub-layer 71a is formed between the data link layer 80b connected to a dependent transmission medium (power line) and the network layer 70.

As illustrated in FIG. 5B, in the LnCP access devices 30, 31, 35 and 36, the layer structure 200b has two physical layers 90c and 90d to be connected to networks including different dependent transmission media (for example, wireless and power line). In addition, the layer structure 200b includes data link layers 80c and 80d corresponding to the physical layers 90c and 90d, respectively, and a network layer 70 for connecting the data link layers 80c and 80d. The upper layers of the network layer 70 are identical to those of FIG. 2, and thus not illustrated.

The layer structure 200b further includes a plurality of home code control sub-layers 71b and 71c for managing home codes for network security. The home code control sub-layers 71b and 71c are formed between the data link layers 80c and 80d connected to dependent transmission media (power lines) and the network layer 70, respectively. That is, the number of the home code control sub-layers 71b and 71c corresponds to the number of the plurality of dependent transmission media or networks which the LnCP access devices 30, 31, 35 and 36 access.

The home code control sub-layers 71b and 71c have different home codes, to maintain security between different dependent transmission media or networks.

As discussed earlier, the present invention provides the home network system using the control protocol which is the general communication standard for providing the functions of controlling and monitoring the electric devices in the home network system.

In addition, the present invention provides the home network system using the LnCP as the general communication standard.

Furthermore, the present invention provides the general communication standard which can be applied to the home network system including the networks using different transmission media and/or different dependent transmission media, and the access devices (routers and/or adapters) based on the communication standard.

At last, the present invention improves network security between different transmission media or different dependent transmission media.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. An access device to connect an electronic device to a dependent transmission medium, the access device comprising:
   a first physical layer configured to be connected to the electronic device through a serial bus;
   a home code control sub-layer, wherein the home code control sub-layer is located in a network layer, the home code control sub-layer configured to set, manage, and process a home code for network security;
   a second physical layer configured to access the dependent transmission medium,
   wherein the home code divides an individual network logically, when accessing the dependent transmission medium,
   wherein a packet is transmitted to the first physical layer from the electronic device through the serial bus,
   wherein the packet includes a packet type field for distinguishing a kind of the packet and a transmission counter field for retrying of the packet,
   wherein the packet type field is set as one of a first value specifying a request packet, a second value specifying a response packet, and a third value specifying a notification packet,
   wherein the transmission counter field is set based on the packet type field, wherein the transmission counter field is set in a range of 1 to 3 when the packet type field is set as one of the first value and the third value, and the transmission counter field is set as 1 when the packet type field is set as the second value,
   wherein the packet is transmitted to the home code control sub-layer from the first physical layer;
   wherein the home code control sub-layer adds a home code in the received packet;
   wherein the home code added packet is transmitted to the second physical layer, and
   wherein the second physical layer transmits the home code added received packet through the dependent transmission medium.

2. The access device of claim 1, wherein the serial bus includes one of a UART and a RS-232.

3. The access device of claim 1, wherein the dependent transmission medium includes one of a power line and wireless.

4. A method for connecting an electronic device with a dependent transmission medium, the method performed by an access device and comprising:
   receiving, at a first physical layer included in the access device, a packet from the electronic device through a serial bus,
   wherein the first physical layer is configured to be connected to the electronic device through the serial bus;
   adding, at a home code control sub-layer included in the access device, wherein the home code control sub-layer is located in a network layer, a home code in the packet,
   wherein the home code control sub-layer is configured to set, manage, and process a home code for network security, and
   wherein the home code divides an individual network logically, when accessing to a dependent transmission medium; and
   transmitting, at a second physical layer included in the access device, the home code added packet through the dependent transmission medium,
   wherein the second physical layer is configured to access to the dependent transmission medium,
   wherein the home code added packet includes a packet type field for distinguishing a kind of the packet and a transmission counter field for retrying of the packet,
   wherein the packet type field is set as one of a first value specifying a request packet, a second value specifying a response packet, and a third value specifying a notification packet,
   wherein the transmission counter field is set based on the packet type field,
   wherein the transmission counter field is set in a range of 1 to 3 when the packet type field is set as one of the first value and the third value, and the transmission counter field is set as 1 when the packet type field is set as the second value.

5. The method of claim 4, wherein the serial bus includes one of a UART and a RS-232.

6. The method of claim 4, wherein the dependent transmission medium includes one of a power line and wireless.

* * * * *